I. HECHENBLEIKNER.
METHOD FOR MANUFACTURE OF MONO AND DI-AMMONIUM PHOSPHATE.
APPLICATION FILED FEB. 10, 1917.
1,264,513.
Patented Apr. 30, 1918.
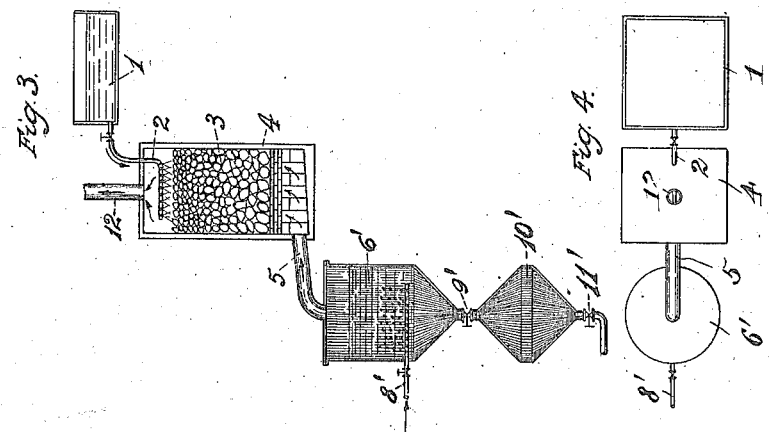
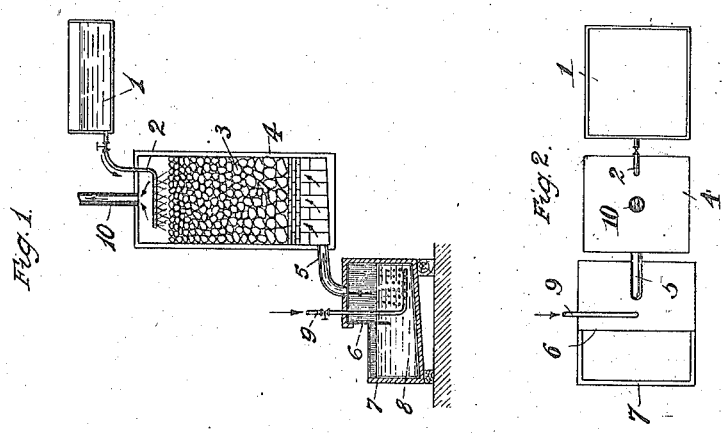

UNITED STATES PATENT OFFICE.

INGENUIN HECHENBLEIKNER, OF CHARLOTTE, NORTH CAROLINA, ASSIGNOR TO SOUTHERN ELECTRO-CHEMICAL COMPANY, OF NEW YORK, N. Y., A CORPORATION OF NEW JERSEY.

METHOD FOR MANUFACTURE OF MONO AND DI-AMMONIUM PHOSPHATE.

1,264,513.  Specification of Letters Patent.  Patented Apr. 30, 1918.

Application filed February 10, 1917. Serial No. 147,964.

*To all whom it may concern:*

Be it known that I, INGENUIN HECHENBLEIKNER, a citizen of the United States, residing at Charlotte, in the county of Mecklenburg and State of North Carolina, have invented certain new and useful Improvements in Methods for Manufacture of Mono and Di-Ammonium Phosphate, of which the following is a specification.

This invention relates to the manufacture of mono and di-ammonium phosphate.

In the present instance it is my purpose to provide for the commercial manufacture of mono and di-ammonium phosphate on a more economical, efficient and labor saving basis than is attainable through the methods and apparatuses at present in use.

It is known that when diluted phosphoric acid is mixed with gas or liquid ammonia in proper chemical proportions, mono, di-ammonium or tri-ammonium phosphate is produced corresponding to the formula

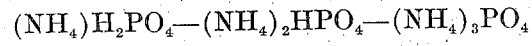

The tri-ammonium phosphate is of no particular commercial importance because of its unstability, while the mono and di-ammonium phosphate being stable commercial products possess distinct value, and therefore the present invention is directed particularly to the production of these two last named products.

In the neutralization of diluted phosphoric acid with gas or liquid ammonia, considerable heat is developed according to the formula

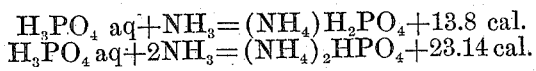

In the practice of my invention I utilize this heat of neutralization to great advantage, and to this end make use of diluted phosphoric acid of proper concentration in addition to so constructing the apparatus as to insure obtaining a pure, fine, dry non-ygroscopic product.

Another object of my invention is to produce the mono and di-ammonium phosphate in commercial form in a single operation, thereby eliminating the necessity of further and separate evaporation of the ammonium phosphate solution which, as is well known, is difficult and costly.

In carrying out my invention I have found, through actual practice, that an admirable and economical concentration of the phosphoric acid for producing mono and di-ammonium phosphate is from 35% to 43% $P_2O_5$, the proper concentration depending upon the purity of the phosphoric acid and the heat insulation and size of the apparatus employed. Commercial phosphoric acid, especially if produced from mineral phosphate rock, contains considerable impurities in the nature of iron, calcium compounds, hydrofluoric acid and sulfuric acid. When the diluted phosphoric acid contains a relatively great amount of these impurities it requires a less degree of concentration to give a suitable precipitation of the mono and di-ammonium phosphate, while such diluted phosphoric acid in its purer states require greater concentration to give the proper crystallization of the mono and di-ammonium phosphate. Furthermore, the better the apparatus is insulated against loss of heat the less need be the concentration of the phosphoric acid, and I have found that, as an average, a good working concentration of the diluted phosphoric acid is approximately 39% $P_2O_5$ but this is of course changeable under the varying conditions above indicated.

The ammonia is preferably used as a gas, more or less pure, as is obtained in commercial operation from gas liquor, by-product coke ovens, the decomposition of cyanamid and the like.

In the present instance I have shown certain forms of apparatus through the agency of which my process may be practised, but I wish it to be understood that I do not confine myself to all the precise details herein set forth, as modification and variation may be made without departing from the spirit of the invention or exceeding the scope of the appended claims.

In the accompanying drawings,

Figure 1 is a vertical sectional view taken through one form of apparatus for the practice of my invention.

Fig. 2 is a top view of the apparatus shown in Fig. 1.

Fig. 3 is a view partly in elevation and partly in section of a modified form of apparatus.

Fig. 4 is a top plan view of the apparatus illustrated in Fig. 3.

Referring now to the accompanying drawings in detail and particularly to Figs. 1 and 2, the numeral 1 indicates a vessel or receptacle adapted to contain the phosphoric acid, and connected with this receptacle is an acid distributer of any desired form shown at 2. The acid flowing from the receptacle 1 is showered by the distributer 2 onto a suitable packing 3 which is preferably arranged for the distribution of the gases and acids in a gas-tight tower or casing 4. Connected with the lower end of the tower or casing 4 is a gas flue 5, which communicates with the gas hood 6 of a container 7. This container 7 is intended to be filled with the ammonium phosphate solution, and the ammonium phosphate crystals separate in the lower corner of the container or at the point indicated by the numeral 8. A suitable feed pipe 9 is employed for introducing the ammonia gas below the surface of the solution and in the form of finely divided sprays or bubbles.

In the operation of the apparatus the phosphoric acid, preferably in the form of approximately 39% solution, is placed in the container 1 and is permitted to run continuously through the acid distributer 2 onto and through the packing 3 in the absorption tower or casing 4. The diluted phosphoric acid in flowing down through the packing material is well distributed, and absorbs all traces of ammonia contained in the gases which flow from the gas hood 6 through the pipe 5 and up through the packing counter current or opposite to the direction of the flow of the acid, the waste gases and vapors escaping through the waste pipe 10 on top of the absorption tower. At the same time the acid in the tower is preheated by the upflowing gas and, containing as it does some ammonia, runs continuously down through the pipe 5 into the saturation tank 7. The ammonia is introduced into the solution in the tank 7 continuously, and as fast as the acid flows into the tank 7 it is neutralized to the proper proportion to give mono or di-ammonium salt. The mono or di-ammonium phosphate crystallizes continuously from the hot solution in the tank 7 and passes to the lower portion of the container indicated at 8 from where it is continuously taken out by strainers or injectors and further dried or treated, as may be desired. The entire apparatus is preferably suitably insulated to save the neutralization heat for evaporation of water, thus allowing a continuous manufacture of solid mono or di-ammonium phosphate in one operation.

In Figs. 3 and 4 I have shown a modified form of apparatus, also employing in this instance the phosphoric acid tank 1, the acid distributer 2, the packing 3 contained within the absorption tower 4, and the gas flue 5. This latter is connected at its outer end with a closed saturation tank 6′ containing the ammonium phosphate solution, the ammonia gas being admitted to the tank 6′ through the pipe line 8′. The bottom of the tank 6′ is preferably of hopper-like formation and is provided with a valved connection 9′ constituting a communication between the tank 6′ and the closed tank 10′, the latter having at its bottom end a valved discharge tube 11′, through which the crystals may be removed. The numeral 12 indicates a waste pipe through which the gases coming up through the packing 3 in the absorption tower 4 may escape to the atmosphere or other point of discharge.

The working of this apparatus is similar to that described for the structure illustrated in Figs. 1 and 2 except that the ammonium phosphate crystals which are separated in the bottom of the saturated tank 6′ are run from time to time in the crystallization tank 10′ from which they may be removed, without disturbing the operation of the apparatus by the simple act of closing the valve of the connection 9′ and opening the valve of the discharge tube 11′. The apparatus shown in Figs. 3 and 4 is particularly adapted for the manufacture of di-ammonium phosphate as the solution in this apparatus is kept in closed containers, thus preventing the loss of ammonia which would be liable to occur in an open apparatus.

It is to be noted that the operation of saturation of the ammonia gas in solution is continuous and that the produced salt may be continuously taken from the boiling liquid. When mono or di-ammonium phosphate is to be produced the flow of acid and ammonia is regulated according to the desired chemical proportion, the ammonium phosphate continuously crystallizing from the hot solution. If desired, the ammonium phosphate crystals as taken from the solution may be further dried by any suitable means as by centrifugals, filters or hydraulic presses, and ultimately dried in steam or air driers if a very dry product is desired.

When di-ammonium phosphate is to be produced the solution in the saturation tank should be saturated hot until it has a slight ammonia odor. Di-ammonium phosphate is less soluble in hot water than in cold water and furthermore hot precipitation prevents the formation of tri-ammonium phosphate and gives a continuous crystallization of pure di-ammonium phosphate producing a fine, crystallized, stable, non-hygroscopic product.

Another advantage incident to my invention is that water is evaporated from the solution in the saturation tank during the saturation period by means of the heat of neutralization, this evaporation saving heat for concentration of the solution, when the apparatus is heat insulated. Furthermore, solid mono and di-ammonium phosphate is produced in a single operation and losses are prevented by treating the gases and vapors arising from the hot solution with the diluted phosphoric acid in a tower or casing operating on the counter-current principle.

What I claim is:

1. The herein described process which comprises introducing ammonia into a body of diluted phosphoric acid and utilizing the heat of neutralization to evaporate water from the resultant solution to produce non-hygroscopic ammonium phosphate crystals.

2. The herein described process comprising introducing ammonia gas into a bath of diluted phosphoric acid, continuously replenishing said bath, and utilizing the heat of neutralization to evaporate water from the resulting solution to produce ammonium phosphate crystals.

3. The herein described process which comprises providing a bath of diluted phosphoric acid by showering the acid through a suitable packing and then conducting the acid to a point of collection where it forms the bath, delivering ammonia to the bath of acid and causing the resultant gases to flow from the bath into contact with but in a direction opposed to the flow of the acid to the bath, and utilizing the heat of neutralization to evaporate the water of the bath to produce dry, non-hygroscopic ammonium phosphate crystals.

4. The herein described process which comprises providing a bath of diluted phosphoric acid by showering the acid downward and then conducting such acid to a point of collection where it forms the bath, delivering ammonia gas in divided streams into the bath of acid at a point below the surface of the latter and causing the resultant gases to flow from the bath upward into contact with but counter-current to the downward flow of the acid to the bath and utilizing the heat of neutralization to evaporate water from the bath to produce dry non-hygroscopic ammonium phosphate crystals.

5. The herein described process comprising introducing ammonia into a bath of diluted phosphoric acid of a concentration of less than one-half phosphorus pentoxid, and utilizing the heat of neutralization of the bath to evaporate water from the resultant solution to produce ammonium phosphate crystals.

6. The herein described process comprising introducing ammonia into a bath of diluted phosphoric acid having from 35% to 43% phosphorus pentoxid, and utilizing the heat of neutralization to evaporate water from the resulting solution to produce ammonium phosphate crystals.

In testimony whereof I affix my signature.

INGENUIN HECHENBLEIKNER.